March 10, 1925.
W. H. POWELL
1,529,636
DYNAMO ELECTRIC MACHINE
Filed Aug. 2, 1920
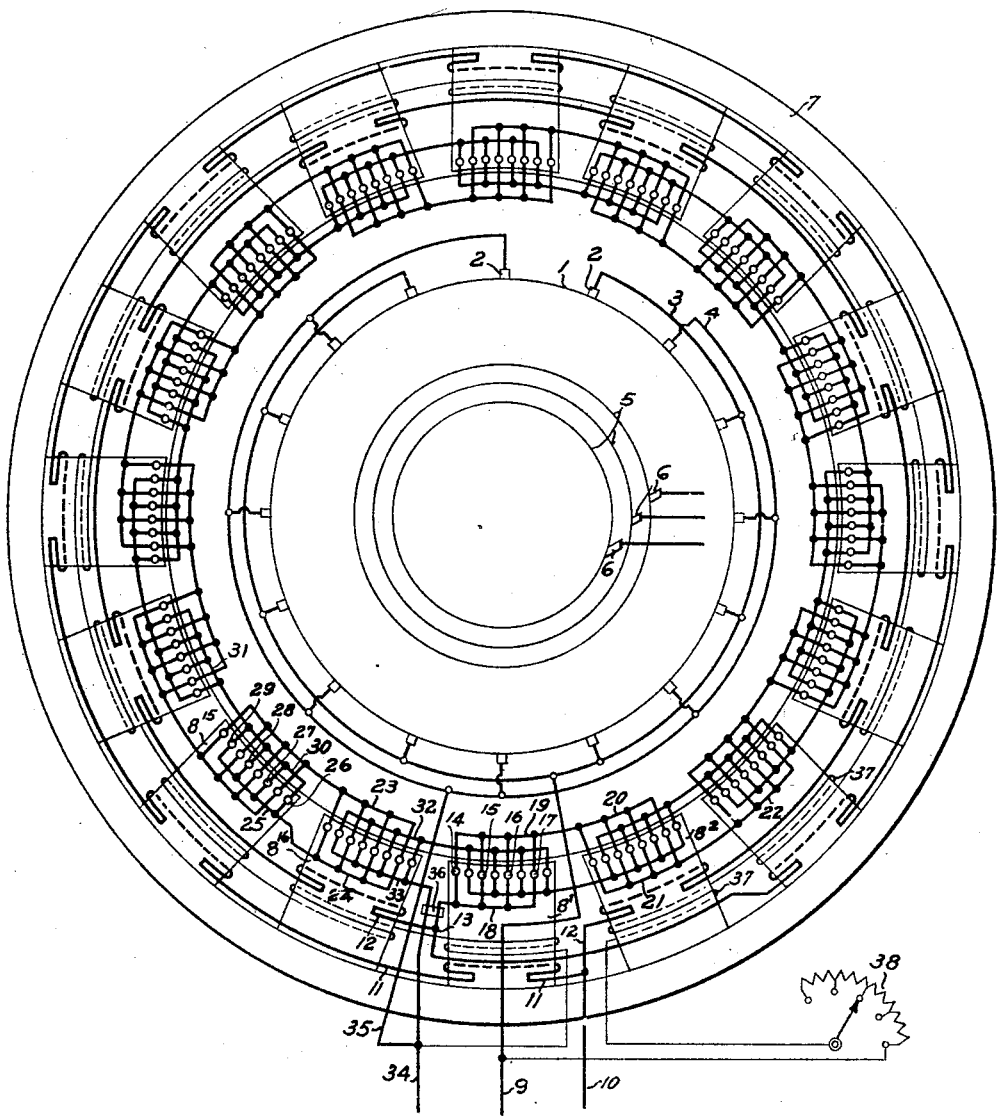
Inventor
W. H. Powell
by
Attorney Patented Mar. 10, 1925.

1,529,636

UNITED STATES PATENT OFFICE.

WILLIAM H. POWELL, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE.

Application filed August 2, 1920. Serial No. 400,600.

*To all whom it may concern:*

Be it known that WILLIAM H. POWELL, a citizen of the United States, residing at Milwaukee, in the county of Milwaukee and State of Wisconsin, has invented a certain new and useful Improvement in Dynamo-Electric Machines, of which the following is a specification.

This invention relates to dynamo electric machines and various features thereof may be applied in either direct current, alternating current, or combined machines.

One of the objects of the invention is the provision of a machine including means whereby the same may be operated efficiently either as a direct current machine, or an alternating current machine, or a machine involving both types of currents. Another object is the provision of means whereby sparkless commutation may be secured.

Still another object of the invention is the provision of means whereby hunting will be prevented when the machine involves the use of alternating current. A more specific object in this connection is the provision of means which may be utilized either for the attainment of sparkless commutation or the prevention of hunting.

A further object is the provision of means for readily starting the machine from the alternating current side and more particularly the use in this connection of the same means which may be utilized for the production of sparkless commutation or the prevention of hunting.

A further object is the provision of a compensating winding which may be wound for a single turn or less but neverthelesss gives the effect of a distributed winding.

Another object is the provision of means whereby the foregoing objects may be attained in a simple and efficient manner. Other objects will appear hereinafter as the description of the invention proceeds.

The novel features of the invention will appear from the specification and the accompanying drawings forming a part thereof and disclosing one embodiment of the invention and all these novel features are intended to be pointed out in the claim.

The single figure of the drawing is a diagrammatic showing in end elevation of a machine which may be used either as a direct current generator, an alternating current generator or a rotary converter, in which the invention has been applied.

The machine is provided with a commutator 1 with which the brushes 2 co-operate. Brushes of the same sign may be connected by collector rings 3—4 respectively. The commutator bars (not shown) may be connected in any suitable or desired manner with the winding of the armature (not shown) as may also slip rings 5 for the A. C. end of the machine. Brushes 6 are provided for co-operating with the slip rings.

The machine is provided with a stator 7 having pole pieces 8.

Two main direct current conductors 9—10 are provided, the conductor 9 being connected directly to the collector ring 3. The conductor 10 is connected, through a series compound winding having the two branches 11—12, to the point of connection 13. At this point the circuit passes into a combined compensating and amortisseur winding the connections of which will be described. Considering first that portion of the compensating winding (as it will be hereinafter designated for brevity) associated with the pole $8'$: this pole piece (as are all the others) is here shown as provided with slots or openings in which the conductors 14—15—16—17 may be placed. These conductors are connected at one end to the point of connection 13 by means of an end connecting member 18. The other ends of these conductors are connected by the end connecting member 19. A structure similar to a grid is thus formed and for the sake of clearness, so that the connections will be readily apparent, this grid has been rotated into the plan of the paper, the circles 14, 15, 16, 17 indicating in cross section the bars of the grid as they are actually related to the pole piece. The end connecting member 19 is connected to another end connecting member 20 and the latter, in combination with the end connecting member 21 connects four conductors similar to conductors 14, 15, 16, 17, disposed in slots or openings in pole $8^2$, to form another grid. The end connecting member 21 is connected to another end connecting member 22 and so on around the successive pole pieces until the pole piece $8^{16}$ is reached which latter is provided with a grid, including four conductor bars, having end connecting member 23—24. The end connecting member 24 is connected to an end connecting member 25 which is here shown as circumferentially within the adjoining end connecting member. The end connecting member 25 is connected to the connductors 26—27—28—29 associated with pole $8^{15}$ and the other ends of these conductors are connected to the end connecting member 30. It will be noted that the direction of progression around the stator poles has now been reversed and the circuit through the grids from end connecting member 31 may be traced in a clockwise direction back to pole $8^{16}$ this pole being provided with another grid having end connecting members 32—33. It will be noted that each pole piece is provided with eight compensating conductors these conductors being so connected that two grids are formed, the bars of which alternate. The last end connecting member 33 may be connected to a conductor 34 which may be connected to an equalizing connector in case the machine is used with other machines. The conductor 34 is connected through conductor 35 to the collector ring 4. The circuit above traced completes the direct current circuit from the main conductors 9—10 through the series compound and compensating windings to the brushes of the commutator.

The machine may also be provided with a shunt winding 37 having a rheostat 38 in series therewith and is here shown as connected across conductors 9—34.

In tracing the circuit of the compensating winding through the various grids in a counter-clockwise direction from the point 13 it will be noted that it is of wave form and is doubly re-entrant, reversing its direction to clockwise when the end connecting member 24 is reached. It will be furthermore noted that this doubly re-entrant wave winding provides for a cross-field of substantially a single turn for each pole piece.

The grid-form of compensating winding enables a sheet of current to be provided for each pole piece with a very small number of turns. In other words, a distributed winding of a single turn or fraction of a turn may be thus secured.

The magnetic action of a compensating winding in producing sparkless commutation is well known to those skilled in the art and need not here be seat forth.

When it is desired to operate the machine as an A. C. generator or a rotary converter the compensating winding may be short-circuited, as by means of a short-circuiting bar 36, which is then connected across the connecting members 18 and 33, or other equivalent electrical points; that is the two ends of the compensating winding. The winding, when so connected by the bar 39, acts as an amortisseur winding and by reason of currents generated therein by undesired relative motion between the rotor and stator will prevent hunting. The short-circuited compensating winding will also that in this case the so-called squirrel-cage winding if it is desired to start the machine from the alternating current end, except that in this case the so-called squirrel-cage is located on the stator.

It should be understood that it is not desired to limit the invention to the exact details of construction herein shown and described, for obvious modifications within the scope of the appended claim may occur to a person skilled in the art.

It is claimed and desired to secure by Letters Patent:

In a dynamo-electric machine adapted to operate either as a D. C. or A. C. machine, a doubly re-entrant compensating winding and means for short circuiting said winding when the machine is running as an A. C. machine.

In testimony whereof, the signature of the inventor is affixed hereto.

WILLIAM H. POWELL.